Figure 1:
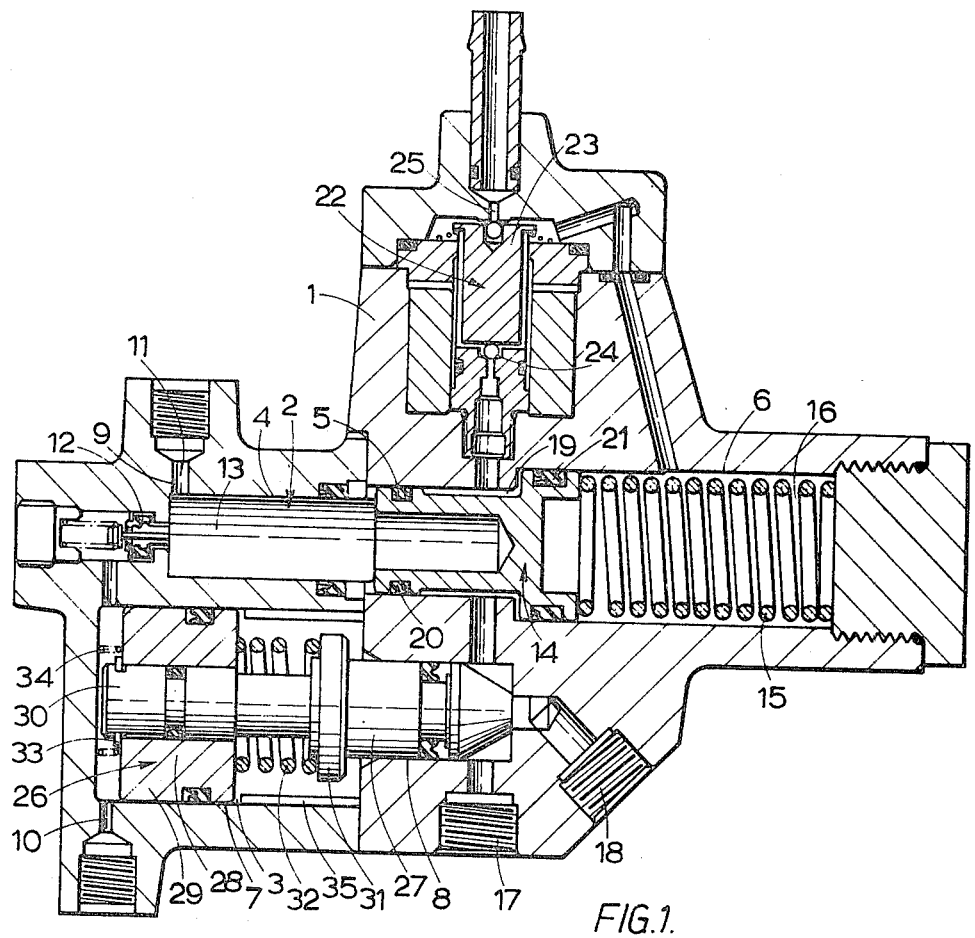

United States Patent [19]

Mortimer

[11] 4,181,372
[45] Jan. 1, 1980

[54] MODULATOR FOR ANTI-SKID VEHICLE BRAKING SYSTEMS

[75] Inventor: Ivan Mortimer, Solihull, England

[73] Assignee: Girling Limited, Birmingham, England

[21] Appl. No.: 856,204

[22] Filed: Nov. 30, 1977

[30] Foreign Application Priority Data

Feb. 26, 1977 [GB] United Kingdom ............... 08260/77

[51] Int. Cl.² ...................... B60T 13/68; F16K 31/06
[52] U.S. Cl. .................... 303/115; 251/129; 251/141
[58] Field of Search ............... 188/181 A; 251/129, 251/141, ; 303/10, 92, 114–116

[56] References Cited

U.S. PATENT DOCUMENTS

| 3,729,169 | 4/1973 | MacDuff | 303/115 X |
| 3,752,538 | 8/1973 | Tribe et al. | 303/115 |
| 3,905,654 | 9/1975 | Tribe | 303/92 X |
| 3,981,543 | 9/1976 | Atkins | 303/115 X |
| 4,072,366 | 2/1978 | Kondo | 303/116 |

*Primary Examiner*—Stephen G. Kunin
*Attorney, Agent, or Firm*—Scrivener Parker Scrivener & Clarke

[57] ABSTRACT

In a pressure modulator for an anti-skid braking system a spring acts through a modulator piston to bias a piston assembly into a position in which an inlet for connection to a pressure source is connected to an outlet for connection to a wheel brake. Normally the spring force is augmented by pressure supplied to the modulator piston through an anti-skid mechanism which cuts off the pressure supply if deceleration of a wheel exceeds a predetermined value, whereby the piston assembly moves into a position in which the outlet is cut-off from the inlet.

1 Claim, 2 Drawing Figures

MODULATOR FOR ANTI-SKID VEHICLE BRAKING SYSTEMS

SPECIFIC DESCRIPTION

This invention relates to improvements in a new or improved pressure modulator for a vehicle anti-skid braking system of the kind comprising a housing, a chamber in the housing having a first inlet for connection to a fluid pressure source and an outlet for connection to a slave cylinder of a wheel brake, a piston assembly working in a first cylinder bore in the housing in communication with the chamber and movable between a first advanced position and a second retracted position, a modulator piston working in a second cylinder bore in the housing and normally acting on the piston assembly to urge the piston assembly into the first advanced position in which the effective volume of the first chamber is at a minimum value and the first inlet and the outlet are in communication, means for normally urging the modulator piston and the piston assembly into the first advanced position, and anti-skid means for controlling the application to the modulator piston of fluid pressure from a modulator pressure source to urge the modulator piston into the second retracted position when the deceleration of a wheel braked by the wheel brake exceeds a predetermined value, such movement of the modulator piston allowing the piston assembly to move to a retracted position in which communication between the first inlet and the outlet is cut-off and the effective volume of the chamber is increased to reduce the pressure applied to the slave cylinder.

Anti-skid braking systems incorporating pressure modulators of the kind set forth are often incorporated in vehicles provided with other power systems, for example, power steering systems, and rather than incorporate two separate high pressure pumps, it is desirable to utilise the pump for the power system as the modulator pressure source under the control of the anti-skid means. The known systems require a by-pass valve to allow the brakes to be applied in the event of failure of the pump for the power system.

According to one aspect of our invention in a pressure modulator of the kind set forth a spring acts on the modulator piston to bias the piston assembly into the first advanced position, the modulator piston is of stepped outline having a first end of smaller area which acts on the piston assembly, a second end of greater area, and a shoulder at the step in diameter, and the housing has a second inlet for connection to the fluid pressure source, and an exhaust port for connection to a reservoir for the fluid pressure source, the shoulder being in communication at all times with the second inlet and normally being in communication with the second end through the anti-skid means so that the spring force is augmented by pressure acting over the difference in area between the shoulder and the second end to maintain the piston assembly in the advanced position, the anti-skid means being operative to isolate the shoulder from the second end, and exhaust the pressure acting on the second end when deceleration exceeds the predetermined value, whereby the pressure acting on the shoulder can overcome the force in the spring.

The housing may have a second outlet for connection to a power system and the fluid pressure source would then comprise a pump for operating the power system.

Thus the pressure from the pump for operating a power-operable mechanism and the power system can be utilised to relieve the braking force under skid conditions. Preferably a control piston assembly of differential outline works in a stepped bore in the housing to control communication between the second inlet and the second outlet.

Upon failure of the pump the spring acts through the modulator piston to urge the piston assembly into the first advanced position to apply the brakes. Thus the brakes can be applied without the provision of a by-pass valve.

Preferably, according to another aspect of our invention, in a pressure modulator of the kind set forth the housing is provided with a second inlet for connection to a pump of a power system which defines the modulator pressure source, and a second outlet for connection to a power-operable mechanism operable by the power system, and a steering control piston assembly of differential outline works in a stepped bore in the housing and is exposed at a first end of greater area to pressure at the first inlet and at a second end of smaller area to pressure at the second inlet, the second end acting to control communication between the second inlet and the second outlet.

Normally the second inlet and the second outlet are in free communication so that the pump pressure can be utilised exclusively for the steering mechanism. When the brakes are applied pressure at the first inlet acts on the control piston assembly to move it in a throttling direction to reduce communication between the second inlet and the second outlet so that the pump pressure increases and is applied to the modulator piston.

Preferably the first end of the control piston assembly comprises the outer ends of inner and outer piston parts which are relatively movable axially, the area of the inner piston part is smaller than the second end of the control piston assembly, and a pre-load spring acts between the piston parts so that both piston parts are movable in unison in the throttling direction until the pressure acting on the first end provides a force sufficient to collapse the spring and until the outer piston part is arrested by a stop in the housing whereafter increase in the pump pressure applied to the modulator piston is regulated in accordance with the area ratio between the outer end of the inner piston part and the second end of the control piston assembly.

Since the brake line pressure acting on the first end of the control piston assembly can increase to a substantial value during a brake application, by reducing the effective area of the first end of the control piston after a brake line pressure has been reached at which the outer piston part is arrested, any subsequent increase in brake pressure causes the pump pressure to increase but at a reduced rate.

Figure 2:
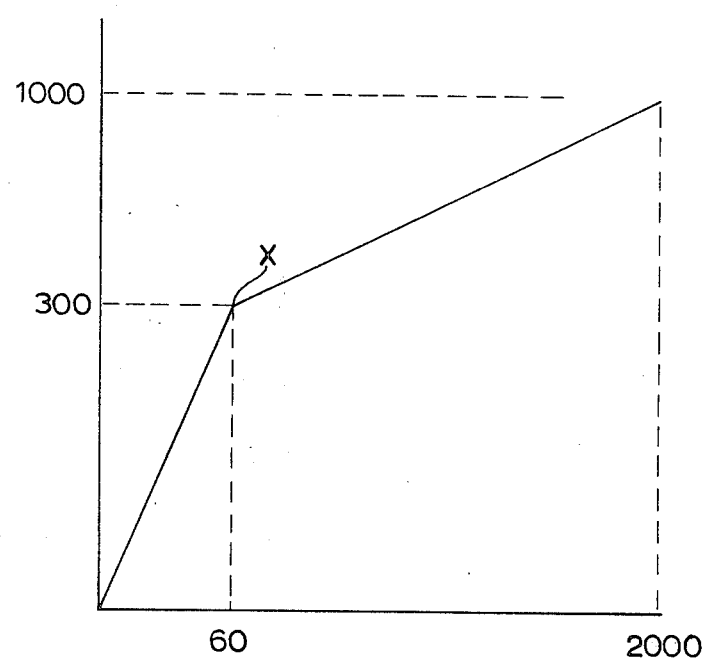

One embodiment of our invention is illustrated in the accompanying drawings in which:

FIG. 1 is a longitudinal section through a pressure modulator for a vehicle hydraulic anti-skid system; and FIG. 2 is a graph of brake line pressure plotted against pump pressure.

The pressure modulator illustrated in the drawing comprises a housing 1 provided with parallel, oppositely arranged stepped bores 2 and 3 of which the bore 2 is provided with three bore portions 4, 5 and 6 each of progressively greater diameter, and the bore 3 has two bore portions 7 and 8 of greater and smaller diameter. Both bores 2 and 3 are closed at opposite ends.

A chamber 9 in the housing at the outer end of the bore portion 4 provides communication between a first inlet port 10 for connection to an hydraulic master cylinder and a first outlet 11 for connection to the slave cylinder of a wheel brake through the bore portion 7 and a control valve 12. The control valve 12 is operated by an expander piston 13 working in the bore portion 4 and movable axially to increase the effective volume of the chamber 9 from a minimum value when the valve 12 is open to a greater value after the valve 12 has closed.

A modulator piston 14 of differerential outline works in the bore portions 5 and 6 and, at its end of smaller area, acts on the expander piston 13 in response to a force in a commpression spring 15 which acts on the opposite end of the piston and is housed in a chamber 16 defined between the piston 13 and the closed adjacent end of the bore 2.

A second inlet port 17 for connection to the high pressure pump of a power system communicates through the bore portion 8 with a second outlet port 18 for connection to a power-operable mechanism of a power system, suitably the steering mechanism of a power steering system, and with a chamber 19 defined in the bore portions 5 and 6 between seals 20 and 21 on the respective smaller and greater diameter portions of the modulator piston 14. Thus an area of the piston 14 comprising the difference between the area of the smaller and greater diameter portions is exposed to the pressure of the pump.

Anti-skid means comprising a solenoid-operated valve 22 incorporating a double-acting valve member 23 normally provides communication between the chamber 19 and the chamber 16 through a seating 24. In this position an exhaust port 25 for connection to a reservoir for the pump is closed. When the deceleration of a braked wheel exceeds a predetermined value the solenoid is energised to urge the valve member 22 in a direction to close the seating 24, thereby isolating the chambers 19 and 16 and placing the chamber 16 in communication with the reservoir.

A control piston assembly 26 works in the bore 3 and comprises pump control piston 27 working in the bore portion 8 and an actuator piston 28 working in the bore portion 7 and acting on the piston 27 at its inner end. The actuator piston 28 comprises concentric outer and inner parts 29 and 30 of which the inner part 30 is of a diameter smaller than that of the piston 27 and at its inner end carries an enlarged head 31 forming an abutment for one end of a compression spring 32 of which the other end acts on the outer part 29 to urge a stop 33 carried by the outer end of the inner part 30 into engagement with the outer end of the outer part 29. A light bias spring 34 acts on the outer part 29 to urge the actuator piston 28 towards the pump control piston 27.

In an inoperative position the inner end of the outer part 29 is spaced from a sleeve 35 in the bore portion 7 which defines a stop limiting movement of the outer part 29 towards the bore portion 8.

In a brakes-off inoperative position the modulator piston 14 and the expander piston 13 are biassed by the spring 15 in a direction to hold the valve 12 open.

The pump applies fluid to the power-operable mechanism through the second inlet port 17 and the second outlet port 18 past the pump control piston 27 which is biassed by the pump pressure towards the outer end of the bore portion 7. At this stage there is no effective pressure in the chamber 19.

When an hydraulic master cylinder is operated to apply the brakes, pressure at the first inlet port 10 which is supplied to the slave cylinder through the valve 12, the chamber 9, and the first outlet 11, acts on the end of the control piston assembly 26 which is of greater area, namely the adjacent outer ends of the outer and inner piston parts 29 and 30. The force of the brake line pressure acting over an end of the piston assembly 26 which is of greater area exceeds the force acting in the opposite direction, namely pump pressure acting on the piston 27, with the result that the piston assembly 26 is moved towards the smaller end of the bore 3 to throttle the flow therethrough from the pump. This, in turn, generates pressure in the chamber 19 which is supplied to the chamber 16 through the solenoid-operated valve 22. Due to the difference in the particular areas of the modulator piston 14 which are exposed to the pressures in the chamber 19 and 16, a resultant force is applied to the piston 14 in a direction to augment the force in the spring 15 and resist any tendency for the expander piston 13 to move in a direction to permit the valve 12 to close, due to the effect of the brake line pressure to which its outer end is exposed. For example, a brake line pressure of 60 p.s.i. will generate, in each chamber 19 and 16, a pressure of 300 p.s.i. Up to a brake line pressure of 60 p.s.i. the brake line pressure acting over the area of the piston 28 is equal to one fifth of the pump pressure acting on the area of the piston 27.

Any increase in brake line pressure above a predetermined value say, 60 p.s.i., causes the spring 32 to collapse allowing forward movement of the outer piston part 29 until it has been arrested by the stop 35 which absorbs the load on that piston part 29. Any further increase in pump pressure in response to increase in the brake line pressure takes place at a reduced rate, determined by the ratio in area between the piston 27 and the inner piston part 30. This is shown in the graph of FIG. 2 where it will be seen that the pump pressure rises rapidly to 300 p.s.i. as the brake line pressure increases to 60 p.s.i. and after a point X has been reached at which the spring 32 collapses, the rate of pump pressure increase takes place at a reduced rate, say up to 1000 p.s.i. in response to an increase in brake line pressure to 2000 p.s.i. Thus, by reducing the effective area of the control piston assembly 26 which is exposed to brake line pressure, the force acting in a direction to throttle and increase the pump pressure is relatively reduced which enables the power steering system to function during a brake application. This avoids overloading the pump whilst enabling maximum braking pressure to be generated.

Above the predetermined value of 60 p.s.i. the brake line pressure acting over the area of the piston 30 plus the load in the spring 32 is equal to the pump pressure acting over the area of the piston 27 where the load in the spring 32 is equal to 300 p.s.i. acting over the area of the piston 27 minus 60 p.s.i. acting over the area of the piston 30.

Under skid conditions when the deceleration of the braked wheel of the vehicle exceeds a predetermined value the solenoid is energised to close the seating 24 thereby isolating the chamber 16 from the chamber 19, and dumping the pressure in the chamber 16 to the reservoir through the then open port 25. Under all conditions of brake application the pressure in the chamber 19 acting over the area which corresponds to the difference between the greater and smaller diameter ends of the piston 14 applies to the piston a force in opposition to, and greater than, the force in the spring 15. Thus, when pressure in the chamber 16 is reduced to atmosphere, the modulator piston 14 and the expander piston 13 move axially towards the greatest area end of the bore 3, initially to permit the valve 12 to close and cut-off communication between the first inlet and the chamber 9, and thereafter to retract and increase the effective volume of the chamber 9, whereby the pressure applied to the slave cylinder is reduced.

After the skid has been corrected the solenoid is de-energised and the chambers 19 and 16 are re-connected. The expander piston 13 is then urged in a direction to increase the pressure applied to the slave cylinder, initially by reducing the effective volume of the chamber 9 and subsequently opening the valve 12.

In the event of failure of the steering pump the spring 15 biases the modulator piston 14 and the expander piston 13 towards the smaller diameter end of the bore 2. This holds the valve 12 in an open position so that pressure can still be generated at the brakes.

I claim:

1. A pressure modulator for a vehicle anti-skid braking system comprising a housing having first and second cylinder bores and a variable volume chamber, said chamber having a first inlet for connection to a fluid pressure source and a first outlet for connection to a slave cylinder of a wheel brake, a piston assembly working in said first cylinder bore in communication with said chamber and including means controlling communication between said first inlet and said first outlet and controlling the effective volume of said chamber said means being movable between a first advanced position in which said effective volume is at a minimum value and said first outlet is in communication with said first inlet, and a second retracted position in which said effective volume is increased to reduce the pressure applied to said slave cylinder and said first inlet is cut-off from said first outlet, a modulator piston of stepped outline working in said second cylinder bore and having a first end of smaller area which acts on said piston assembly, a second end of greater area, and a shoulder at a step in diameter between said ends, said housing having a second inlet for connection to said fluid pressure source, means connecting said second inlet to said shoulder at all times, spring means acting on said modulator piston with a force biassing said modulator piston and said piston assembly towards said first advanced position, anti-skid means controlling communication between said shoulder and said second end so that said shoulder is normally in communication with said second end and said spring force is augmented by the pressure at said second inlet acting over a difference in area between said shoulder and said second end to maintain said piston assembly in said advance position, said anti-skid means being operative to isolate said shoulder from said second end and exhaust said pressure acting on said second end when a skid detection signal exceeds a predetermined value, whereby pressure at said second inlet acting on said shoulder overcomes said spring force to urge said modulator piston into said second retracted position, wherein said housing has a second outlet for connection to a power operable mechanism operable by said pressure source, and a third cylinder bore of stepped diameter having a first bore portion of greater diameter and a second bore portion of smaller diameter, and a control piston assembly of differential outline works in said third bore, said control piston assembly comprising an outer piston part and an inner piston part which are relatively movable, said outer piston part working in said first bore portion, and said inner piston part having a first piston portion of greater area which works in said second bore portion and a second piston portion of smaller area which works through a longitudinally extending bore in said outer piston part, said outer piston part and said second piston portion being exposed to pressure at said first inlet, and said first piston portion being exposed to pressure at said second inlet, a face between said second inlet and said second outlet with respect to which said first piston portion is movable to define throttle means for regulating flow between said second inlet and said second outlet, a pre-load spring means acting between said inner and outer piston parts to permit both said inner and outer piston parts to move in unison, and stop means in said housing for arresting movement of said outer piston part in a direction towards said second bore portion, whereafter said throttle means is operated in accordance with the area ratio of said first and second piston portions.

* * * * *